United States Patent Office 3,501,317
Patented Mar. 17, 1970

3,501,317
SHRIMP COOKING PROCESS
Preston L. Veltman, Severna Park, Md., assignor to W. R. Grace & Co., New York, N.Y., a corporation of Connecticut
No Drawing. Filed June 12, 1967, Ser. No. 645,463
Int. Cl. A23l 1/33, 29/00
U.S. Cl. 99—111                                      7 Claims

ABSTRACT OF THE DISCLOSURE

Shrimp are cooked by heating the shrimp with steam under pressure at a temperature of from about 200° F. to about 260° F. for a period of from about 1 to about 12 minutes and thereafter cooling the hot shrimp under pressure with water at a temperature below about 125° F.

---

The present invention relates to a novel and useful process. More particularly, it relates to a process for cooking raw shrimp.

It is known in the art that raw shrimp may be cooked under a variety of conditions. In general, it is conventional to cook shrimp in water or in brine solution at a temperature of from about 170° F. to about 212° F. for periods of the order of 5 to 20 minutes. See U.S. Patents 2,488,184, 2,863,779 and 3,276,878. When cooking in an aqueous solution under the conditions described in the patents, a substantial weight loss is noted as a result of the cooking process. This weight loss generally runs from about 30 to 40% so that 100 pounds of shrimp in the cooking process results in only 60–70% pounds of shrimp in the final product. Since shrimp is a quite expensive food commodity, this loss of weight in the final product merely increases its price per pound to the ultimate consumer. Accordingly, if a process could be developed which did not result in such a high weight loss, it would be widely accepted by the shrimp industry.

It is an object of the present invention to provide a process for cooking shrimp which results in a minimum weight loss. A further object is to provide a simple and inexpensive process for cooking shrimp. Another object is to provide a cooking process which can be accomplished in a minimum amount of time. Other objects will become apparent as the description of the invention proceeds.

These objects are accomplished by the present invention which provides a process for cooking shrimp which comprises heating the shrimp with steam under pressure at a temperature of from about 220° F. to about 260° F. for a period of from about 1 to about 12 minutes and thereafter cooling the hot shrimp under pressure with water at a temperature below about 125° F.

In a preferred embodiment of the present invention the shrimp are cooked with saturated steam at a temperature of from about 225° F. to about 260° F. and a pressure of from about 4 to about 21 p.s.i.g. In the preferred embodiment, the shrimp are cooked for a period of about 1 to about 10 minutes. In a still more preferred embodiment, the shrimp are cooked for a period of from about 3 to about 6 minutes and are then cooled by water at a temperature of from about 32° F. to about 50° F.

The most preferred cooling medium is ice water but when not available water at a temperature of about 100° F. or even 125° F., can be employed to obtain the increased yields of the present invention.

Generally, saturated steam is employed for the cooking process and typical temperature/pressure relationships are as follows; 227.1° F. at 5 p.s.i.g., 239.4° F. at 10 p.s.i.g. 249.8° F. at 15 p.s.i.g. and 258.8° F. at 20 p.s.i.g. Some water is always present in the pressure vessel due to condensation of the steam on the cooler shrimp. In some instances, it is desirable to have water in the pressure cooker but the fastest cook is obtained with the shrimp above the water level. Condensate from the cooking of the shrimp may be cooled and utilized as the cooling "water" for subsequent batches of shrimp. Salts and other materials may be added to cooling "water." Other aqueous systems may be used as isotonic fluids for the cooling process and all such fluids are considered equivalent to "water" in the practice of the present invention.

The raw shrimp employed in the present process may be peeled and deveined or they may be cooked directly without peeling. In general, a higher percentage yield will be obtained when utilizing unpeeled shrimp but such shrimp generally requires a slightly longer cooking time. The cooking time depends on the size of the shrimp and temperature employed and varies from 1 to about 12 minutes. With shrimp of about 20–30 count size, a cooking time of 3 to 6 minutes is generally employed with temperature of 240–250° F. Obviously, with a lower temperature a slightly longer cooking time may be required. Larger shrimp may require a slightly longer cooking time and smaller shrimp a shorter cooking time.

The present process is generally carried out with unfrozen raw shrimp. If frozen shrimp are employed, they should be either thawed before use or an additional period added to the cooking time so that they will thaw and be cooked in the process.

In cooling the cooked shrimp in the present process, it is essential that they be cooled under pressure to a temperature below 212° F. prior to the opening of the cooker. In general, ice water, or at least water below 125° F. will be used for the cooling process. To prevent the condensation of the steam (under pressure) in the cooker when the cold water is admitted, air pressure, or other gas pressure, is applied to the cooker. A convenient method of cooling is to build up about 5 pounds air pressure while turning off the steam and then constantly supplying air to maintain the pressure as the cold water is admitted to the hot cooker. Simple pressure regulators are used to accomplish this purpose. After cooling, the air is merely vented through a top drain.

In the following examples a 3 gallon pressure cooker is modified as follows. A petcock is attached to the central portion of the cover with a tube running to a sink. A ½" steam line is attached to the bottom of the pressure cooker to act as a source of supply of saturated steam at a preregulated pressure. The cooker contains a 1" drain (with valve) at both the top and bottom portions of the cooker. A ½" air line (with valve) is attached to the top portion of the cooker so that air at 20 lbs. p.s.i.g. is supplied to the cooker. The cooker also contains a safety valve set at 23–25 p.s.i.g. A thermocouple is placed in the cooker so as to read the temperature (° F.) in the space above the top of the basket of shrimp when it is positioned in the cooker. The cooker also contains a second small pointed thermocouple which is inserted into a shrimp in the middle of the basket so as to read the shrimp temperature. Tap water at 55–65° F. or ice water is supplied to the cooker at 25–30 p.s.i.g. by means of a ½" water line. The cooker is also equipped with a pressure gauge and a sight gauge so that the pressure and the level of water in the cooker can be easily read.

EXAMPLE 1

Two gallons of 25–30 count raw shrimp are peeled and deveined. A 1 gallon basket is filled with shrimp (after weighing the shrimp) and placed in the above-described 3 gallon cooker which has been preheated by bleeding steam into the open cooker for about 5 minutes. A metal plate is placed on top of the shrimp to hold them in the basket. The basket takes up the bottom half of the cooker due to the extra space around the basket. The cover is closed and all valves are turned off with the exception of the top petcock and top drain. The steam valve is then turned on supplying steam at about 15 p.s.i.g. and approximately 250° F. As soon as the steam is turned on it flushes the air from the cooker and the top drain is closed. The thermocouple shows a rise in temperature from room temperature to 250° F. with a corresponding rise in pressure (15 p.s.i.g.) in approximately 1 minute. The shrimp are cooked at this temperature for 4 minutes. The thermocouple inserted into the shrimp shows a slower rise in temperature to the cooking temperature. The shrimp temperature during most of the cooking is actually in the range of 230–240° F. with the higher temperature at the end of the cooking period. After cooking 5 minutes the steam is shut off while simultaneously opening the air valve to build up the pressure to 20 p.s.i.g. The air line is left open to maintain 20 p.s.i.g. in the cooker as the water valve is opened to admit water for cooling the shrimp. When the water has filled over half of the cooker and covers the shrimp, the thermocouple in the shrimp indicates that they have been cooled to a temperature of below 100° F. The air supply is shut off and the pressure vented through the top drain. By the time complete venting has taken place, the pressure cooker has filled with water and overflows in the top drain. The water is turned off and the bottom drain opened. The cover of the cooker is removed and the shrimp taken from the cooker and weighed.

The ratio of wet weight of the cooked shrimp to the wet weight of the uncooked shrimp is about 0.85 showing about 15% loss in weight from the cooking process.

EXAMPLE 2

The procedure of Example 1 is repeated employing 1 gallon of unpeeled shrimp. The shrimp temperature during most of the cooking is actually in the range of 215–230° F. with the higher temperature at the end of the cooking period.

The ratio of wet weight of the cooked shrimp to the wet weight of the uncooked shrimp is about 0.90 showing about a 10% loss in weight in the cooking process.

EXAMPLE 3

The procedure of Example 1 is repeated employing a cooking temperature of 240° F. with steam supplied at about 10 p.s.i.g. The cooking time is 5 minutes instead of 4 minutes and ice water is used to cool the shrimp rather than tap water. The shrimp temperature during most of the cooking is actually in the range of 200–230° F. with the higher temperatures at the end of the cooking period.

The ratio of wet weight of the cooked shrimp to the wet weight of the uncooked shrimp is about 0.88 showing a 12% loss in weight from the cooking process.

While in the above example nothing is added to the shrimp during the cooking process, it is obvious that salt, pepper, and other seasonings and spices may be added to flavor the shrimp. Also, in the examples, shrimp of the substantially uniform size are used in the cooking process. This is desirable in order to obtain a uniform cook of the shrimp. However, shrimp of the different sizes may be cooked together providing the process is sufficiently long to completely cook the largest of the shrimp. The present process may also be used to only partially cook shrimp which in some instances is desirable when the ultimate consumer completes the cook in his own home.

Many equivalent modifications and variations of the present invention will be apparent to those skilled in the art from a reading of the foregoing with a departure from the inventive concept.

What is claimed is:

1. A process for cooking shrimp which comprises heating the shrimp under pressure at a temperature of from about 220° F. to about 260° F. with steam for a period of from about 1 to about 12 minutes and thereafter cooling the hot shrimp under pressure with water to a temperature below about 125° F.

2. A process for cooking shrimp which comprises heating the shrimp under pressure at a temperature of from about 220° F. to about 260° F. with saturated steam for a period of from about 1 to about 10 minutes and immediately threafter cooling the hot shrimp under pressure with water to a temperature below about 100° F.

3. A process for cooking shrimp which comprises heating the shrimp under a pressure of from about 4 to about 21 p.s.i.g. at a temperature of from about 225° F. to about 260° F. with saturated steam for a period of from about 1 to about 10 minutes and immediately thereafter cooling the hot shrimp under pressure with water to a temperature below room temperature while maintaining pressure on shrimp.

4. The process of claim 3 wherein the shrimp are peeled.

5. The process of claim 3 wherein the shrimp are unpeeled.

6. The process of claim 3 wherein the shrimp are cooked for a period of from about 3 to about 6 minutes.

7. The process of claim 3 wherein the water is at a temperature of from about 32° F. to about 50° F.

References Cited

Tressler, Marine Products of Commerce, Mar. 31, 1958 pp. 595 and 602, Reinhold Publishing Corp. New York, N.Y.

A. LOUIS MONACELL, Primary Examiner

ROBERT M. ELLIOTT, Assistant Examiner

U.S. Cl. X.R.

99—158, 195